United States Patent [19]

Sugiura, deceased et al.

[11] 3,794,133

[45] Feb. 26, 1974

[54] DRIVING APPARATUS FOR MOTOR VEHICLE

[75] Inventors: Shinzo Sugiura, deceased, late of Katsuta, Japan by Yoko Sugiura, administratrix; Takeshi Morioka; Ryoji Kasama, both of Katsuta, Japan

[73] Assignee: Hitachi, Ltd., Tokyo, Japan

[22] Filed: Oct. 18, 1971

[21] Appl. No.: 190,092

[52] U.S. Cl. ............... 180/65 R, 74/752 D, 74/866
[51] Int. Cl. ...... B60k 1/00, F16h 3/74, B60k 21/00
[58] Field of Search ........ 74/752 D, 866; 180/7, 65; 290/7

[56] References Cited
UNITED STATES PATENTS

| | | | |
|---|---|---|---|
| 3,628,621 | 12/1971 | Lee | 180/65 R |
| 3,667,325 | 6/1972 | Ito et al. | 74/866 |
| 3,604,288 | 9/1971 | Mori | 74/752 D X |
| 3,657,934 | 4/1972 | Ito et al. | 74/866 X |

Primary Examiner—Arthur T. McKeon
Attorney, Agent, or Firm—Craig and Antonelli

[57] ABSTRACT

A driving apparatus for a motor vehicle, which employs a power transmission mechanism for transmitting the rotation of a driving motor of the motor vehicle to the driving wheels through a transmission gear mechanism, and in which in order to operate said transmission gear mechanism to a change gear ratio of large output torque at an intersection point between the revolutional speed-revolutional torque curves of an output shaft of said transmission gear mechanism as is obtained at optional change gear ratios, the revolutional speed corresponding to said intersection point between said revolutional speed-rotational torque curves is detected to automatically operate said transmission gear mechanism.

6 Claims, 4 Drawing Figures

INVENTORS
TAKESHI MORIOKA, RYOJI KASAMA,
SHINZO SUGIURA

BY Craig, Antonelli & Hill
ATTORNEYS 3,794,133

DRIVING APPARATUS FOR MOTOR VEHICLE

BACKGROUND OF THE INVENTION

1. Field of the Invention

The present invention relates to driving apparatus in motor vehicles, and more particularly it intends to suggest a mechanism for automatically operating the change gear ratio of a transmission gear mechanism interposed between a driving motor and driving wheels.

2. Description of the Prior Art

In apparatus for driving a vehicle with an electric motor employed as a source of power, the driving motor is advantageously made as a low current type in order to make a control circuit small in capacity. When the motor is therefore made as a low current type, it should be made large in configuration or the revolutional speed should be decreased by means of a reduction gear mechanism to increase the revolutional torque in order to obtain a large revolutional torque. Since, with the reduction gear mechanism, the motor is over-rotated in the case of high-speed running of the vehicle, it is required that the reduction gear mechanism be operated to change the change gear ratio. The motor vehicle, however, has a great advantage in that it may electrically control the revolutional speed of the motor over a wide range, thereby to realize a speed control using no gear mechanism for the speed change operation. Accordingly, it leads to deprivation of this advantage and it is not preferable to use a speed change mechanism of manual operation as in conventional vehicles driven by an internal combustion engine.

SUMMARY OF THE INVENTION

An object of the present invention is to provide a driving apparatus which may accomplish preferable driving characterwstics over a wide range using an electric motor of small-sized and high-speed type.

Another object of the present invention is to provide an easily manipulated driving apparatus for a motor vehicle, by automating the operation of a transmission gear mechanism interposed between a driving motor and the driving wheels.

Still another object of the present invention is to provide an automatic speed-change mechanism for effectively transmitting the revolutional torque characteristics of a driving motor to the driving wheels.

Further objects of the present invention will be understood from the description of typical embodiments.

A feature of the present invention resides in that a driving motor designed in a small-sized and high-speed type is coupled through a transmission gear mechanism to a driving shaft, and that the change gear ratio of the transmission gear mechanism is automatically changed-over to one increasing the revolutional torque, at an intersection point between the revolutional speed-revolutional torque characteristic curves of the driving shaft as are obtained under different change gear ratios in predetermined running regions of the driving motor.

DESCRIPTION OF THE PREFERRED EMBODIMENTS

Figure 1:
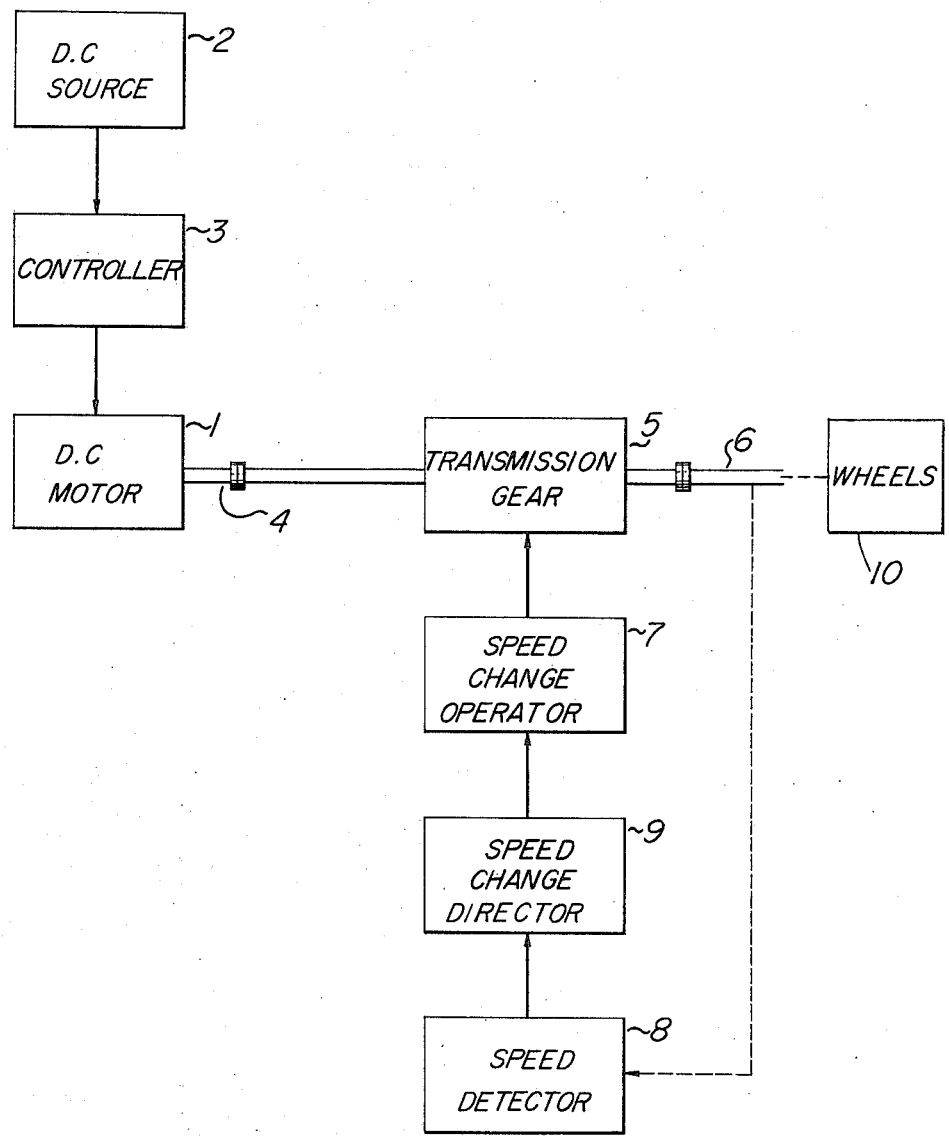
FIG. 1 is a block diagram of the whole drive system of the present invention.

The whole drive system will be described with reference to FIG. 1. Numeral 1 designates a series-wound DC motor for drive, which is electrically connected through a current (voltage) controller 3 to a DC power source 2 and which is operated by electric power supplied from the DC power source 2. An output shaft 4 of the motor 1 is coupled through a transmission gear mechanism 5 of the type disclosed in U.S. Pat. No. 3,448,640 to a driving axle 6. The vehicle driving axle 6 serves to rotate driving wheels 10 to drive forward the vehicle. The transmission gear mechanism 5 is operated by a speed change operator 7 (by means of electromagnetic force, hydraulic pressure, or the like) to have the transmission gear ratio changed. The speed change operation is effected such that the speed of revolution of the driving axle 6 is detected by a revolutional-speed detector 8 of the type disclosed in U.S. Pat. No. 3,448,640, and that a gear ratio is indicated in conformity with a predetermined pattern by a speed change director 9. In actuality, where the speed of revolution is lower than a predetermined value, the speed change operation is carried out so as to make the transmission gear ratio (the reduction gear ratio) large.

In accordance with the objects of the present invention, there is used as the electric motor 1 one of small-size and high-speed type (in which although the maximum torque is small, decrease in the revolutional torque is comparatively small even at high speed).

Figure 2:
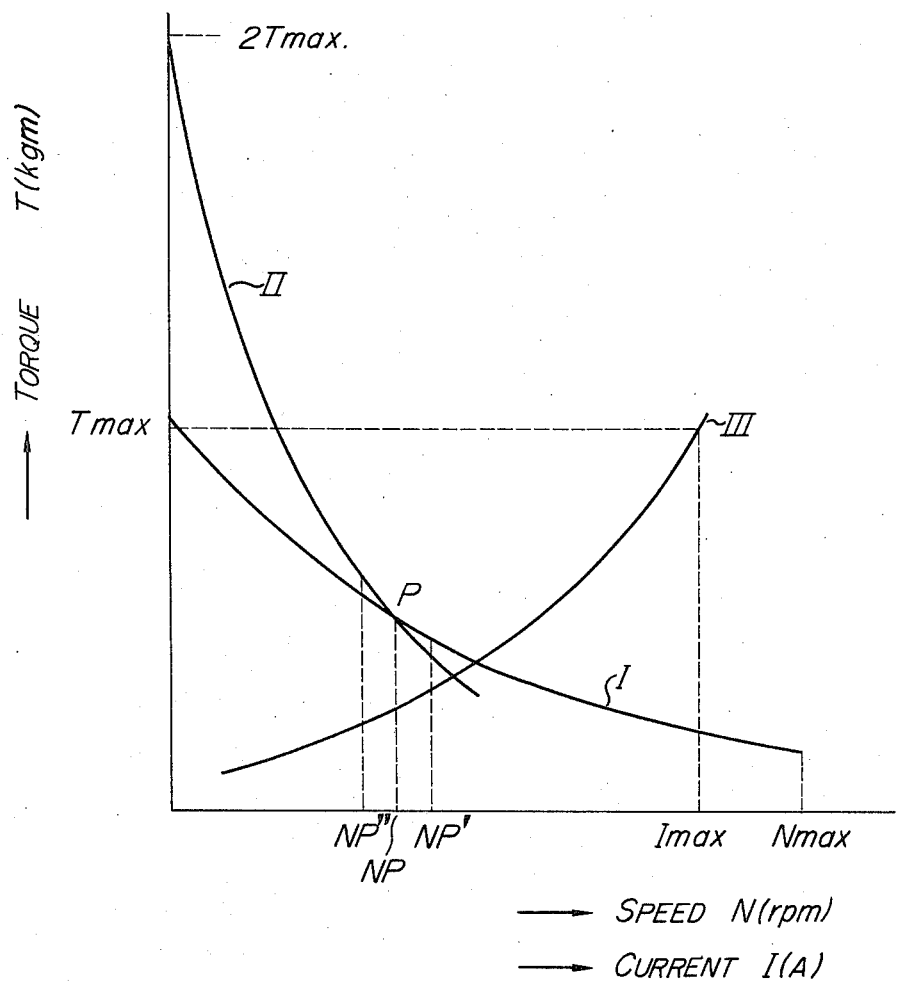
FIG. 2 is a graph of output characteristic curves of an output shaft of a transmission gear mechanism.

Referring to FIG. 2, the speed change operation pattern will be explained. The efficiency of the transmission gear mechansm 5 is assumed to be 100 percent. The revolutional speed-revolutional torque characteristic curve of the motor 1 is set at curve I in FIG. 2, in which curve I is for a transmission gear ratio of 1 while curve II is for a transmission gear ratio of 2 (decelerating the speed to one-half). Curve III depicts the rotational torque T characteristic versus load current I.

When a certain fixed terminal voltage is supplied to the driving motor 1 and the change gear ratio of the transmission gear mechanism 5 is made 1, the revolutional torque T characteristic versus the revolutional speed N of the driving axle 6 becomes curve I in FIG. 2. The characteristic has a feature that, while the revolutional torque T in a low-speed region is small, the revolutional torque T in a high-speed region is comparatively large. In contrast, curve II shows a case where the motor 1 is operated in the same state with the change gear ratio of the transmission gear mechanism 5 being made 2, and is a characteristic being one half in the revolutional speed N and double in the revolutional torque T. Then, since the revolutional torque T which may be taken out from the driving axle 6 should advantageously be larger, it is more advantageous to use the driving system such that, in the higher revolutional-speed region with respect to a revolutional speed NP corresponding to an intersection point P between the curves I and II, the change gear ratio of the transmission gear mechanism 5 is made 1, while in the lower revolutional-speed region, that of the same is made 2. More specifically, assuming that the maximum current which may be caused to flow to the driving motor 1 be $I_{max.}$, if the change gear ratio of the transmission gearings 5 is 1, the maximum revolutional torque $T_{max.}$ is obtained along curve I from the driving axle 6. When, however, the change gear ratio of the transmission gear mechanism 5 is made 2 at the revolutional speed NP corresponding to the intersection point between the curves I and II, the revolutional speed of the motor 1 is doubled, but the revolutional torque T of the driving axle 6 may reach a revolutional torque of $2T_{max.}$ along curve II. In a state in which the driving axle 6 is in the region above the revolutional speed NP, if the change gear ratio of the transmission gearings 5 is made 1, the revolutional torque T of the driving motor 1 appears at the driving axle 6 as it is, and a high revolutional torque may be maintained up to the maximum allowable speed of revolution $N_{max.}$ of the driving motor 1.

Accordingly, when the revolutional speed NP of the driving axle 6 as corresponds to the intersection point P between the curves I and II is detected to automatically operate the transmission gearings 5, the driving axle 6 may output large revolutional torques is a wide revolutional-speed region.

Figure 3:
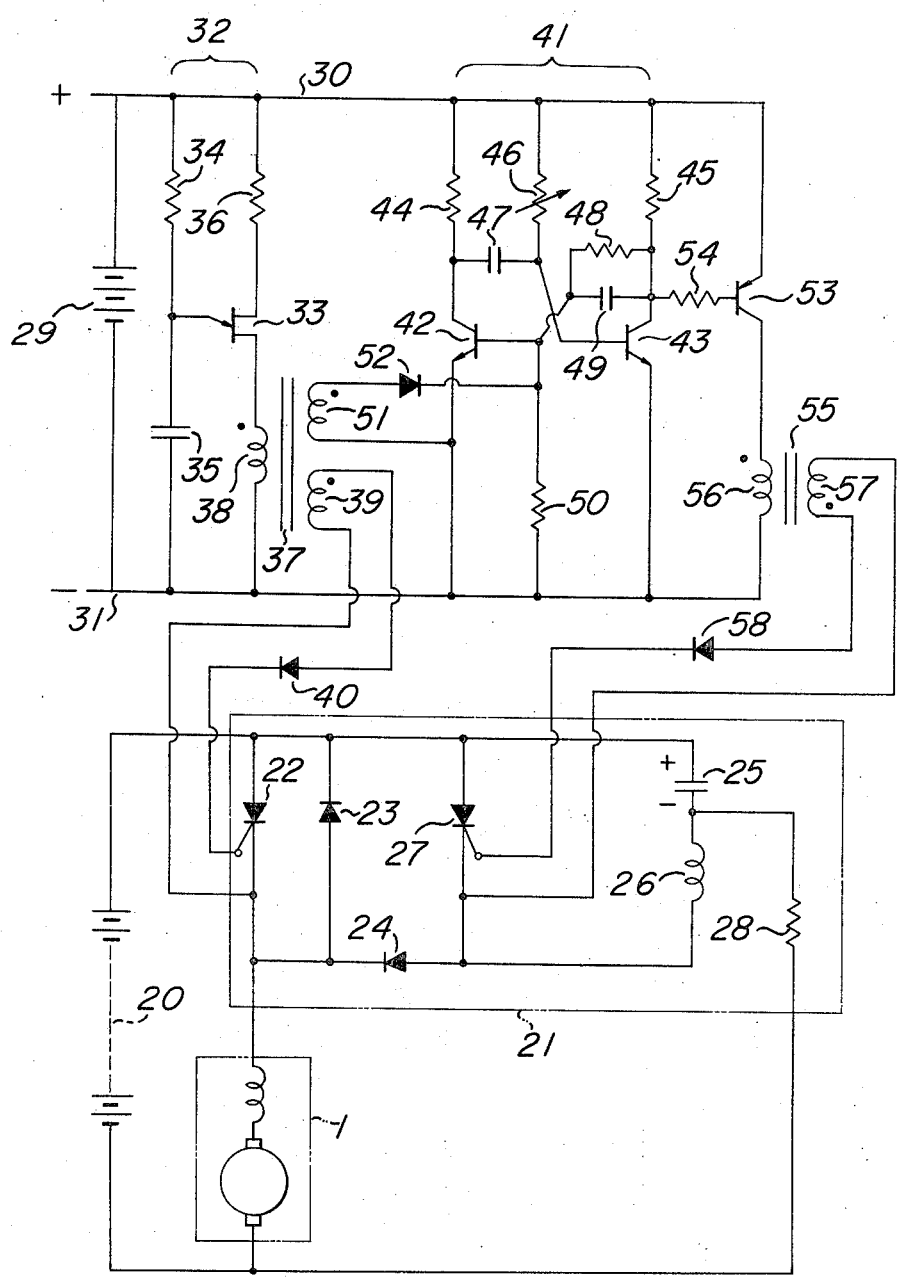
FIG. 3 is an electrical connection diagram of a system for controlling a motor.

Referring now to FIG. 3, description will be made of an embodiment of electrical means for controlling the driving motor 1. Shown at 20 are storage batteries, which are connected through a thyristor chopper circuit 21 to the series-wound DC motor 1. The thyristor chopper circuit 21 is constituted by a main thyristor 22 connected in forward polarities with respect to a load current, a by-pass diode 23 connected in the opposite direction to and in parallel with the main thyristor 22, a series circuit for commutation consisting of a capacitor 25 and a reactor 26, which circuit is connected through a reverse-current blocking diode 24 to the main thyristor 22 in parallel therewith, an auxiliary thyristor 27 for discharging charges of the capacitor 25 in the series circuit to the reactor 26, thereby providing an oscillating current to turn off the main thyristor 22, and a resistor 28 for charging the capacitor 25. Such main current circuit operates as follows:

First of all, the capacitor 25 is charged in illustrated polarities by the storage batteries 20 through a circuit of the reactor 26 — diode 24 — electric motor 1 and the resistor 28. Upon subsequently turning on the main thyristor 22, the voltage of the storage batteries 20 is applied to the motor 1, and the motor 1 starts revolution. When the auxiliary thyristor 27 is subsequently turned on after a time $T_1$, charges in the capacitor 25 are discharged to the reactor 26. Thereafter, the capacitor 25 is charged in the opposite polarities to those as shown by self-induction of the reactor 26. Since the voltage of the capacitor 25 is thereafter applied through the diode 24 to the main thyristor 22 in backward polarities, the main thyristor 22 is forcibly turned off. Simultaneously therewith, the voltage is also applied to the auxiliary thyristor 27 in backward polarities to also turn off the auxiliary thyristor 27. Thereafter, the charges of the capacitor 25 are recovered through the diodes 23 and 24 to the capacitor 25 in the illustrated polarities. Of course, the recovering process also utilizes the self-inductance action of the reactor 26. When both the thyristors 22 and 27 are thus turned off, the capacitor 25 is supplementarily charged through the circuit of the reactor 26 — diode 24 — motor 1 and the resistor 28. Thereafter, the main thyristor 22 is again turned on after the lapse of a time $T_2$, and the foregoing operation is repeated.

According to such chopper control, the average voltage $E1(V)$ applied to the motor 1 becomes, when the terminal voltage of the storage batteries 20 is expressed by $E20(V)$, $$E1 = E20 \cdot (T_1/T_1 + T_2)$$

(V)

It is accordingly made possible to control the motor 1 by varying either or both of the time widths $T_1$ and $T_2$. The embodiment shown in FIG. 3 makes the time width $T_1 + T_2$ constant, and controls the ratios. Hereinbelow will be described control means therefor.

While numeral 29 indicates auxiliary storage batteries, it is also possible, if necessary, to voltage-regulate the storage batteries 20 to replace them. Lead wires 30 and 31 are led out from electrodes of the batteries 29. Shown at 32 is an astable oscillator circuit of fixed frequency which uses a unijunction transistor 33, a resistor 34 and a capacitor 35. One of the bases of the unijunction transistor 33 is connected through a resistor 36 to the lead wire 30, while the other base is connected through the primary coil 38 of a pulse transformer 37 to the lead wire 31. The resistor 34 and the capacitor 35 are connected in series, the intermediate connection point is connected to the emitter of the unijunction transistor 33, an outer end of the resistor 34 is connected to the lead wire 30, and an outer end of the capacitor 35 is connected to the lead wire 31. The first secondary coil 39 of the pulse transformer 37 is connected through a diode 40 across the gate and cathode terminals of the main thyristor 22 in the thyristor chopper circuit 21. Shown at 41 is a monostable multivibrator including NPN-type transistors 42 and 43, in which the emitters of both the transistors are commonly connected to the lead wire 31, while the collectors are respectively connected through resistors 44 and 45 to the lead wire 30. The base of the transistor 43 being normally in the conducting state is connected through a variable resistor 46 to the lead wire 30, and is connected through a capacitor 47 to the collector of the transistor 42 on the other side. The variable resistor 46 and the capacitor 47 serve to control the metastable period of time of the monostable multivibrator, and the former 46 is adapted to be operated by an accelerator pedal. The base of the transistor 42 being normally in the non-conducting state is connected to the collector of the transistor 43 through a parallel circuit consisting of a resistor 48 and a capacitor 49, and is connected to the lead wire 31 through a resistor 50. The second secondary coil 51 of the pulse transformer 37 is connected through a diode 52 to the base and emitter electrodes of the transistor 42, and is so arranged as to drive the monostable multivibrator 41 into the metastable state. Numeral 53 indicates a PNP-type transistor for amplification, the emitter of which is connected to the lead wire 30, the base is connected through a resistor 54 to the collector of the transistor 43, and the collector is connected through a primary coil 56 of a pulse transformer 55 to the lead wire 31. A secondary coil 57 of the pulse transformer 55 is connected through a diode 58 across the gate and cathode of the auxiliary thyristor 27 in the thyristor chopper circuit 21.

With the above construction, the capacitor 35 in the astable oscillator circuit 32 is charged through the resistor 34. Every time the terminal voltage of the capacitor reaches a predetermined emitter voltage of the unijunction transistor 33, the charges are discharged to the primary coil 38 of the pulse transformer 37, to generate pulse voltages in the secondary coils 39 and 51. The circuit constants are set such that the generation interval of the pulse voltages is made constant at the time width $T_1 + T_2$. When the pulse voltage is induced in the secondary coil 39, it turns on the main thyristor 22 in the thyristor chopper circuit 21 through the diode 40, thus to feed the motor 1 with the supply voltage. Simultaneously, the voltage is also induced in the secondary coil 51, and it turns on the transistor 42 in the monstable multivibrator 41 to bring it into the metastable state. The metastable period of time of the monostable multivibrator 41 is determined by the time constant between the resistor 46 and the capacitor 47, and after the lapse of this time (assumed to be $T_1$), the transistor 43 turns on to return to the stable state. Then the transistor 53 also turns on to cause a current to flow through the primary coil 56 of the pulse transformer 55, so that the auxiliary thyristor 27 in the thyristor chopper circuit 21 is fired by a pulse voltage induced in the secondary coil 57. It is as stated previously that the thyristor chopper circuit 21 is turned off by the firing of the auxiliary thyristor 27.

Accordingly, if the resistance 46 is varied by the accelerator pedal so as to change the metastable time $T_1$ of the monostable multivibrator 41, the average output voltage of the thyristor chopper ciruit 21 may be controlled.

Figure 4:
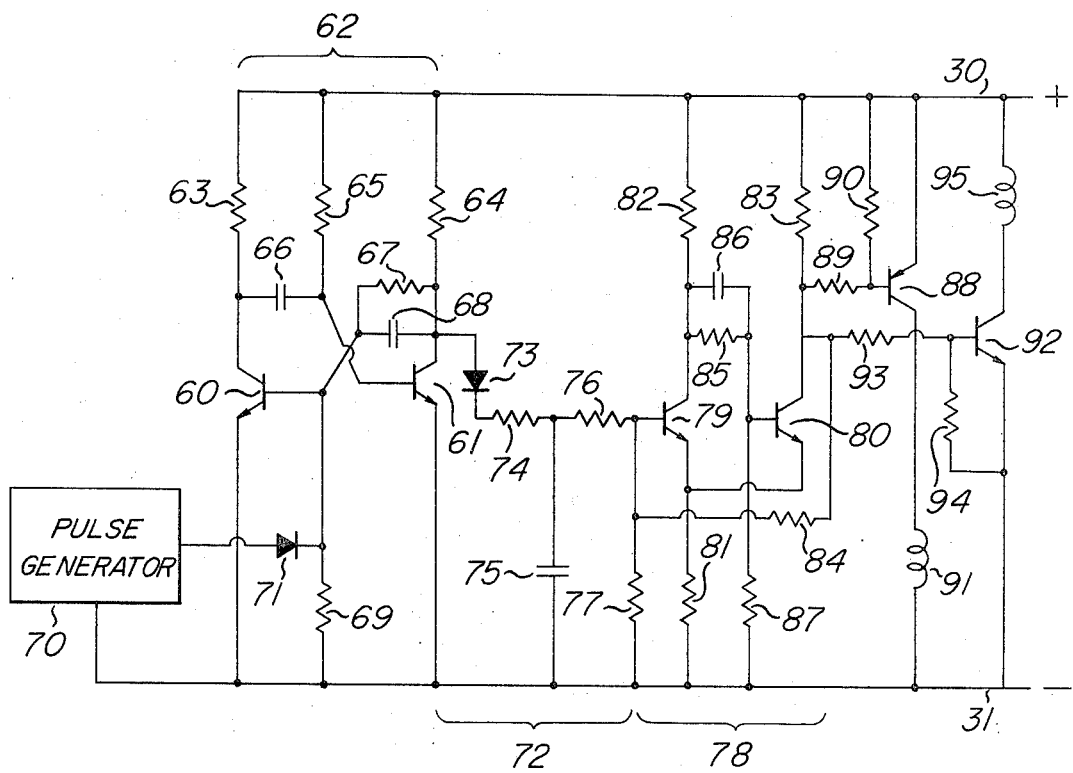
FIG. 4 is an electrical connection diagram of a system for automatically controlling the transmission gear mechanism.

With reference to FIG. 4, there will now be described a control system for the speed change operation of the transmission gear mechanism 5. Lead wires 30 and 31 are extensions of those shown in FIG. 3. First, NPN-type transistors 60 and 61 are used to constitute a monostable multivibrator 62. The emitters of the transistors 60 and 61 are connected to the lead wire 31, the collectors are respectively connected through resistors 63 and 64 to the lead wire 30, and the base of the transistor 61 is connected through a resistor 65 to the lead wire 30 and is connected through a capacitor 66 to the collector of the transistor 60. The base of the transistor 60 is connected to the collector of the transistor 61 through a parallel circuit consisting of a resistor 67 and a capacitor 68, and is connected to the lead wire 31 through a resistor 69. Shown at 70 is a pulse generator, which generates pulse voltages in response to revolution of the driving axle 6 and which is adapted to turn on the transistor 60 through a diode 71. Numeral 72 indicates an averaging circuit, which is constructed such that the collector voltage of the transistor 61 in the monostable multivibrator 62 is taken out through a diode 73 and a resistor 74 into a smoothing condenser 75 and that it is applied through voltage divider resistors 76 and 77 to the base of an input transistor 79 of a Schmitt circuit 78. The Schmitt circuit 78 serves to detect a voltage corresponding to the revolutional speed NP at the intersection point P illustrated in FIG. 2. NPN-type transistors 79 and 80 have the emitters connected in common, and thereafter connected through a resistor 81 to the lead wire 31. The collector of the transistor 79 is connected through a resistor 82 to the lead wire 30. The transistor 80 has the collector connected through a resistor 83 to the lead wire 30, and connected through a feedback resistor 84 to the base of the transistor 79, so as to provide a hysteresis characteristic. The base of the transistor 80 is, on one hand, connected through a resistor 85 and a capacitor 86 to the collector of the transistor 79 at the preceding stage, while it is, on the other hand, connected through a resistor 87 to the lead wire 31. Numeral 88 indicates a PNP-type amplifier transistor, the emitter of which is connected to the lead wire 30, and the base is connected through a resistor 89 to the collector of the transistor 89 and through a resistor 90 to the lead wire 30. The collector of the transistor 88 is connected through an electromagnetic coil 91 to the lead wire 31. The electromagnetic coil 91 is for the speed change operation of the transmission gear mechanism 5, and operates to make the transmission gear ratio 2 (to decrease the speed to one half) when a current flows therethrough. Shown at 92 is an NPN-type amplifier transistor, the emitter of which is connected to the lead wire 31, while the base is connected through a resistor 93 to the collector of the transistor 80 and through a resistor 94 to the lead wire 31. The collector is connected through an electromagnetic coil 95 to the lead wire 30. The electromagnetic coil 95 effects the speed change operation for the transmission gear mechanism 5, and functions to make the change gear ratio 1 (to directly couple the driving axle to the driving motor) when a current flows therethrough.

In the above construction, the pulse generator 70 generates pulse voltages at intervals proportional to the revolutional speed N of the driving axle 6, to bring the monostable multivibrator 62 into the metastable state. More specifically, an output pulse of the pulse generator 70 turns on the transistor 60 of the monostable multivibrator 62, and turns off the transistor 61. When the transistor 61 is turned off, the collector voltage becomes the same as the electric potential of the lead wire 30 thereby charging the capacitor 75 through the diode 73 and the resistor 74. Since the non-conducting time width of the trnasistor 61 is determined to a fixed value by the time constant between the resistor 65 and the capacitor 66, the capacitor 75 is charged by that number of rectangular wave voltages which corresponds to the revolutional speed N of the driving axle 6. The terminal voltage of the capacitor 75 averaged by this capacitor becomes one of a value proportional to the revolutional speed N.

Therefore, if the input voltage of the Schmitt circuit 78 as applied after the voltage division by the resistors 76 and 77 is lower than a set voltage of the circuit (a voltage corresponding to the revolutional speed N is made the set voltage), the transistor 79 is turned off while the transistor 80 is turned on, so that the transistor 88 is turned on to cause the current to flow through the electromagnetic coil 91. As previously stated, the electromagnetic coil 91 makes 2 the change gear ratio of the transmission gearings 5 when the current flows therethrough. As a result, the driving axle 6 is operated in this region under the characteristic shown at curve 11 in FIG. 2.

Next, when the revolutional speed N of the driving axle 6 rises and the input voltage of the Schmitt circuit 78 reaches the voltage corresponding to the intersection point P, the transistor 79 is turned on while the transistor 80 is turned off. Accordingly, the transistor 88 is turned off to cut off the current of the electromagnetic coil 91, and instead, the transistor 92 is turned on to cause the current to flow through the electromagnetic coil 95. As stated previously, when the current flows through the electromagnetic coil 95, the change gear ratio of the transmission gearings 5 becomes 1. Of course, the other transistor 88 is kept non-conductive in this case, so that the current through the electromagnetic coil 91 is cut off.

The fundamental, speed change operation of the transmission gear mechanism 5 is thus realized. As a practical matter, however, when the revolutional speed N of the driving axle 6 rises and falls in the vicinity of the revolutional speed NP corresponding to the intersection point between the curves I and II in FIG. 2, the speed change operation becomes unstable. In order to stabilize it, the present invention feeds back the collector voltage of the transistor 80 of the Schmitt circuit 78 to the base of the transistor 79 through the resistor 84, thereby providing the hysteresis characteristic. More specifically, the Schmitt circuit 78 has the transistor 80 turned on in the rising process of the revolutional speed of the driving axle 6, so that no voltage is applied to the base of the transistor 79 through the feedback resistor 84. The Schmitt circuit 78 therefore operates so that the revolutional speed N of the driving axle 6 may become a revolutional speed NP' slightly higher than the set revolutional speed NP indicated in FIG. 2. Then, the change gear ratio of the transmission gear mechanism 5 is changed-over to 1 at the revolutional speed NP', and the output characteristic of the driving axle 6 shifts from curve II to curve I. Herein, since the transistor 80 of the Schmitt circuit 78 is kept off in the falling process of the revolutional speed N at curve I, the collector voltage of the transistor 80 is kept applied through the feedback resistor 84 to the base of the transistor 79. As a result, the voltage corresponding to the revolutional speed N of the driving axle 6 as is applied from the capacitor 75 returns the Schmit circuit 78 at a speed NP'' which is lower than the set speed NP. The hysteresis width (NP' − NP'') may be optionally set by the value of the feedback resistor 84.

While the foregoing embodiments have been described only of the case where the change gear ratios of the transmission gear mechanism are 1 and 2, it is apparent that the invention is applicable to cases of other change gear ratios. In addition, it is a matter of course that the number of stages of the speed change operation may be increased to 3, 4 or more stages.

We claim:

1. A driving apparatus for a motor vehicle, comprising a DC power source, a voltage controller, and an electric driving motor, said electric driving motor being powered by said DC power source connected thereto via said voltage controller, a transmission gear mechanism having a variable gear ratio and having an input shaft coupled to said driving motor and an output shaft, driving axle means coupled to said output shaft of said transmission gear mechanism for driving at least one wheel of the vehicle, detector means for detecting the speed of revolution of said driving axle means and for providing an output indicative thereof, and speed changing means responsive to the output of said detecting means for altering the gear ratio of said transmission gear mechanism, said speed changing means providing an increased speed reduction gear ratio of said transmission gear mechanism when the output of said speed detector means is less than an output corresponding to an output in a predetermined region of the intersection between two predetermined different revolutional speed vs. torque characteristic curves of said driving axle means.

2. A driving apparatus for a motor vehicle according to claim 1, wherein said speed changing means includes an electrical level discriminator circuit for generating a signal for changing the gear ratio of the transmission gear mechanism when the ouput of said speed detecting means exceeds the output corresponding to the predetermined region of the intersection point between said two curves.

3. A driving apparatus for a motor vehicle according to claim 1, wherein said two different revolutional speed vs. torque characteristic curves of said driving axle means correspond to the curves for two different gear ratios of said transmission gear mechanism.

4. A driving apparatus for a motor vehicle according to claim 1, whereing said speed changing means includes circuit means for providing a first signal when the output of said speed detector means is less than the output corresponding to said predetermined region of the intersection point and for providing a second signal when the output of said speed detector means exceeds the output corresponding to said predetermined region of the inersection point.

5. A driving apparatus for a motor vehicle according to claim 4, wherein said first signal of said circuit means is applied to a first electro-magnetic coil for providing said increased speed reduction gear ratio and said second signal is applied to a second electromagnetic coil for providing another gear ratio.

6. A driving apparatus for a motor vehicle according to claim 4, wherein said circuit means includes a Schmitt circuit having a predetermined output applied thereto corresponding to the output of the speed detector means at the intersection point of said two curves.

* * * * *